(12) United States Patent
Lin

(10) Patent No.: US 9,167,521 B2
(45) Date of Patent: Oct. 20, 2015

(54) WIRELESS COMMUNICATION METHOD WITH LOW POWER CONSUMPTION

(75) Inventor: Yung-Sen Lin, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 263 days.

(21) Appl. No.: 13/282,420

(22) Filed: Oct. 26, 2011

(65) Prior Publication Data

US 2013/0039239 A1  Feb. 14, 2013

(30) Foreign Application Priority Data

Aug. 10, 2011  (TW) .............................. 100128593 A

(51) Int. Cl.
*G08C 17/00* (2006.01)
*H04W 52/02* (2009.01)

(52) U.S. Cl.
CPC ............ *H04W 52/0229* (2013.01); *Y02B 60/50* (2013.01)

(58) Field of Classification Search
CPC . H04W 88/06; H04W 16/14; H04M 2250/02; H04M 2250/06
USPC ........... 370/311, 338; 709/208; 455/509, 574, 455/552, 445
See application file for complete search history.

(56) References Cited

U.S. PATENT DOCUMENTS

| 7,590,432 | B2 * | 9/2009 | Behzad et al. ................ 455/574 |
| 2002/0026492 | A1 * | 2/2002 | Fujita ........................... 709/208 |
| 2004/0110530 | A1 | 6/2004 | Alone |
| 2004/0185857 | A1 * | 9/2004 | Lee et al. ...................... 455/445 |
| 2005/0054291 | A1 | 3/2005 | Park |
| 2005/0186906 | A1 | 8/2005 | Hussmann |
| 2007/0082716 | A1 | 4/2007 | Behzad |
| 2007/0275746 | A1 * | 11/2007 | Bitran .......................... 455/509 |
| 2008/0181155 | A1 * | 7/2008 | Sherman et al. ............. 370/311 |
| 2009/0047991 | A1 * | 2/2009 | Elg ............................. 455/552.1 |
| 2010/0309815 | A1 * | 12/2010 | Yepez et al. .................. 370/254 |
| 2011/0065382 | A1 | 3/2011 | Collier |
| 2011/0158212 | A1 * | 6/2011 | Sakai et al. .................. 370/338 |

FOREIGN PATENT DOCUMENTS

| CN | 101009504 A | 8/2007 |
| CN | 101662448 A | 3/2010 |

OTHER PUBLICATIONS

6. Architecture, "Wireless Personal Area Networks", IEEE Standards Draft, P802.15.1a/D0, Sep. 13, 2003, pp. 23-54, XP017646946, vol. 802.15, IEEE, NJ, USA.

MRPM SG, Multi-Radio PM Draft Technical Requirements, IEEE 802.21 Session #25 in Orlando, 21-08-0008-00-mrpm, Jan. 2008, pp. 1-17, XP017659802, IEEE, NJ, USA.

* cited by examiner

*Primary Examiner* — Dang Ton
*Assistant Examiner* — Lionel Preval
(74) *Attorney, Agent, or Firm* — Winston Hsu; Scott Margo

(57) ABSTRACT

A wireless communication device includes a Wi-Fi module for operating in WLAN system and a Bluetooth module for operating in Bluetooth system. After entering a power-saving mode, the wireless communication device is configured to turn off the Wi-Fi module and periodically scan an operational frequency band of a network using the Bluetooth module. When detecting a radio frequency signal having the same bandwidth as the network in the operational frequency band, the wireless communication device is configured to enter a normal mode.

5 Claims, 4 Drawing Sheets

WIRELESS COMMUNICATION METHOD WITH LOW POWER CONSUMPTION

BACKGROUND OF THE INVENTION

1. Field of the Invention

The present invention is related to a wireless communication method with low power consumption, and more particularly, to a wireless communication method with low power consumption by scanning wireless signals using a Bluetooth module.

2. Description of the Prior Art

In a local area network, many terminals may be connected for providing fast and efficient data transmission between different users. A wireless local area network (WLAN) further eliminates the need to set up cables and provides users with easy access to various network resources using portable wireless communication devices.

In a prior art WLAN system, a wireless communication device includes a wireless fidelity (Wi-Fi) module capable of establishing wireless connection with a network. Batteries are the most common power supply of the wireless communication device. In order to reduce power consumption, the wireless communication device is normally configured to operate in a normal mode or a power-saving mode. The Wi-Fi module which consumes large amount of power is activated in the normal mode, but turned off in the power-saving mode. Since the current wireless connection is cut off after entering the power-saving mode and frequency scan is required for establishing new wireless connection after switching back to the normal mode, the prior art wireless communication device may not be able to provide network services immediately after switching operational modes.

Intel Corporation has developed a technique known as AOAC (always on & always connected), in which a scan engine is installed in the Wi-Fi module of the wireless communication device. After entering an AOAC power-saving mode, the Wi-Fi module is first turned off, and then periodically activated for performing frequency scan. If the Wi-Fi module can detect a WLAN access point, the wireless communication device may then be waked up for establishing connection with the WLAN access point. Although the prior art AOAC technique can provide immediate network services, the Wi-Fi module may consume large amount of power when performing frequency scan in the power-saving mode. If there is no access point near the wireless communication device, the periodically activated Wi-Fi module in the power-saving mode may perform unnecessary frequency scan, thereby consuming extra power.

SUMMARY OF THE INVENTION

The present invention provides a wireless communication method with low power consumption. The method includes turning off a Wi-Fi module of a wireless communication device after entering a power-saving mode; periodically scanning an operational frequency band of a network using a Bluetooth module of the wireless communication device in the power-saving mode; and waking up the wireless communication device for entering a normal mode when detecting a first radio frequency signal within the operational frequency band, wherein a bandwidth of the first radio frequency signal is equal to a bandwidth of the network.

These and other objectives of the present invention will no doubt become obvious to those of ordinary skill in the art after reading the following detailed description of the preferred embodiment that is illustrated in the various figures and drawings.

DETAILED DESCRIPTION

Most wireless communication devices are configured to support WLAN system and Bluetooth system. Bluetooth is a short-range wireless communication technology characterized in low power consumption, using omni-directional antennas, and the ability of automatically identifying or accessing other Bluetooth devices within communication range.

Figure 1:
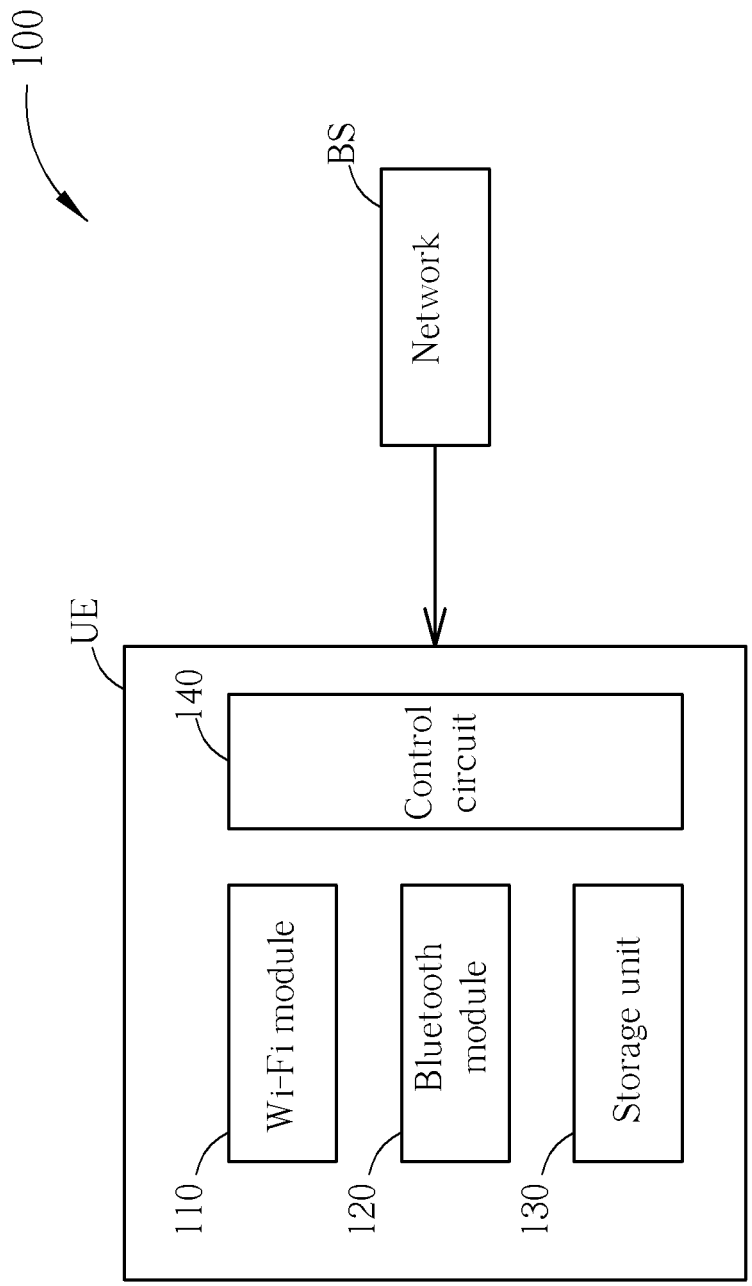
FIG. 1 is a function diagram of a wireless network system according to the present invention.

FIG. 1 is a function diagram of a wireless network system 100 according to the present invention. The wireless network system 100 includes a wireless communication device UE and a network BS. The wireless communication device UE includes a Wi-Fi module 110, a Bluetooth module 120, a storage unit 130, and a control circuit 140. The network BS may be, but not limited to, a WLAN base station or a WLAN access point.

Figure 2:
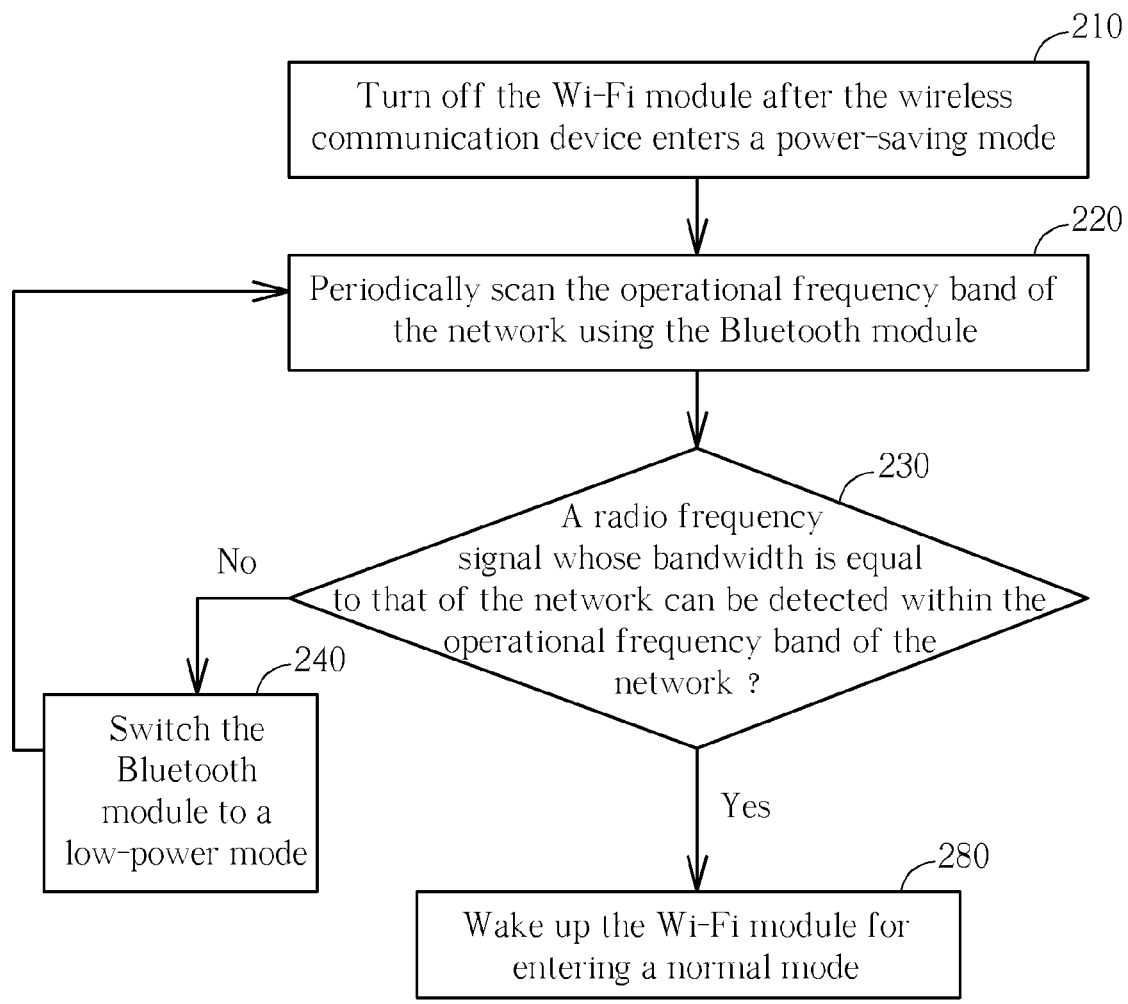
FIG. 2 is a flowchart illustrating the operation of a wireless network system according to a second embodiment of the present invention.

FIG. 2 is a flowchart illustrating the operation of the wireless network system 100 according to a first embodiment of the present invention. The flowchart in FIG. 2 includes the following steps:

Step 210: turn off the Wi-Fi module 110 after the wireless communication device UE enters a power-saving mode.

Step 220: periodically scan the operational frequency band of the network BS using the Bluetooth module 120.

Step 230: determine whether a radio frequency signal whose bandwidth is equal to that of the network BS can be detected within the operational frequency band of the network BS: if yes, execute step 280; if no execute step 240.

Step 240: switch the Bluetooth module 120 to a low-power mode; execute step 220.

Step 280: wake up the Wi-Fi module 110 for entering a normal mode.

When operating in the normal mode, the wireless communication device UE consumes more power since all devices of the wireless communication device UE are activated for providing full services. When operating in the power-saving mode, the wireless communication device UE may reduce power consumption by turning off unused devices and only providing limited services. Since the Wi-Fi module 110 consumes large amount of power when performing frequency scan, the control circuit 140 is configured to turn of the Wi-Fi module 110 after the wireless communication device UE enters the power-saving mode, as depicted in step 210. The power-saving mode may include sleeping mode, hibernate mode or standby mode whose name and detailed operation may vary according to the type and manufacturer of the electronic device. But the fundamental principle of turning off devices which consume large power or are not in use remains the same. As well known to that skilled in the art, the term "power-saving" does not limit the scope of the present invention.

In a WLAN system, the network BS has an operational frequency band between 2412 MHz-2484 MHz and a bandwidth of either 20 MHz or 40 MHz. A Bluetooth system provides 79 channels, each having a bandwidth of 1 MHz, within an operational frequency band between 2400 MHz-2480 MHz. The Bluetooth system and the WLAN system both use ISM (industrial scientific medical) 2.4G frequency band for data transmission. In order to reduce interference, Bluetooth introduces adaptive frequency hopping (AFH) which adapts the access channel sharing method so that the transmission does not occur on channels that have significant interference. The transmission of packets are assigned on one of the 79 channels that has low interference level and reassigned to one of the remaining unused 78 channels that has low interference level after a predetermined period elapses. Such frequency hopping may be performed 1600 times per second.

In step 220, the operational frequency band of the network BS may be periodically scanned using the Bluetooth module 120 which adopts the current AFH technique. FIGS. 3A-3D are diagrams illustrating embodiments of the radio frequency signals detected within the 2.4 GHz ISM frequency band by the Bluetooth module 120.

Figure 3A:
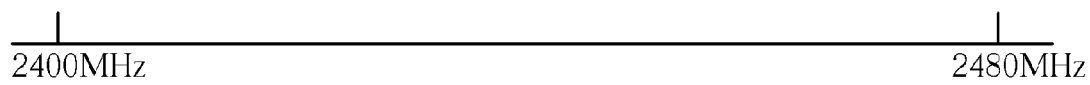
FIGS. 3A~3D are diagrams illustrating embodiments of the radio frequency signals detected within the 2.4 GHz ISM frequency band by a Bluetooth module.

In the embodiment illustrated in FIG. 3A, the Bluetooth module 120 is unable to detect any radio frequency signal within the 2.4 GHz ISM frequency band. In the embodiment illustrated in FIG. 3B, the Bluetooth module 120 is able to detect a radio frequency signal whose bandwidth is 1 MHz (the bandwidth of a Bluetooth channel) within the 2.4 GHz ISM frequency band. In the embodiment illustrated in FIG. 3C, the Bluetooth module 120 is able to detect a radio frequency signal whose bandwidth is 20 MHz (the bandwidth of 20 consecutive Bluetooth channels) within the 2.4 GHz ISM frequency band. In the embodiment illustrated in FIG. 3D, the Bluetooth module 120 is able to detect a radio frequency signal whose bandwidth is 40 MHz (the bandwidth of 40 consecutive Bluetooth channels) within the 2.4 GHz ISM frequency band.

In step 230, the control circuit 140 is configured to determine whether a radio frequency signal can be detected within the operational frequency band of the network BS and whether the bandwidth of a detected radio frequency signal is equal to that of the WLAN system.

Figure 3B:
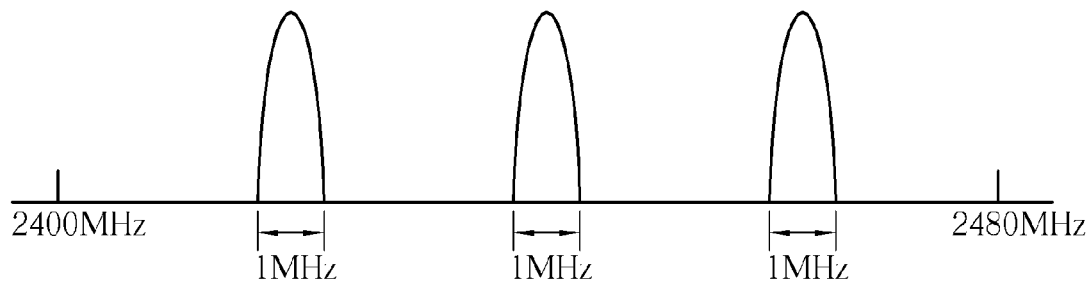

In the embodiment illustrated in FIGS. 3A and 3B, the control circuit 140 may determine that there is no WLAN access point within the 2.4 GHz ISM frequency band, or the detected radio frequency signal may be noise or from other devices. Under such circumstance, step 240 is then executed for switching the Bluetooth module 120 to the low-power mode. The low-power mode may include sniff mode, hold mode or park mode whose operations are explained in detail in Bluetooth specifications and well-known to those skilled the art.

Figure 3C:
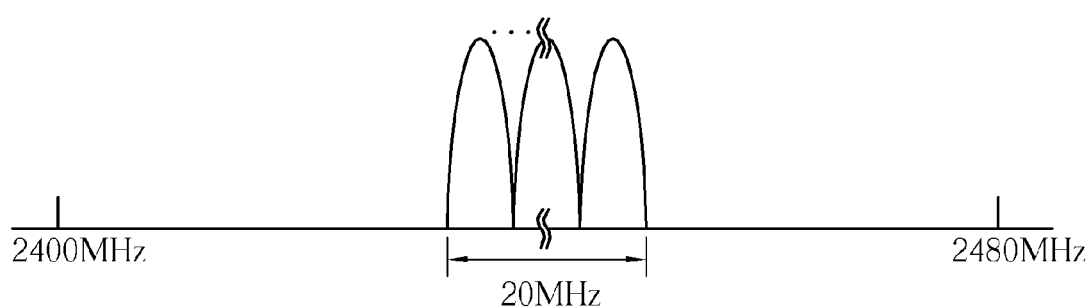
Figure 3D:
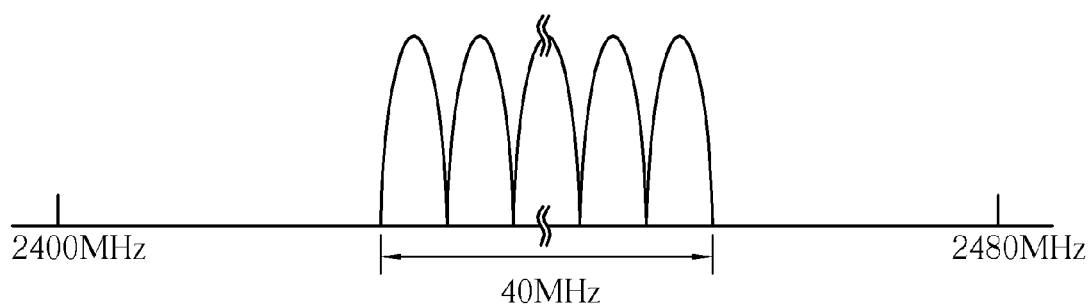

In the embodiments illustrated in FIGS. 3C and 3D, the control circuit 140 may determine that the detected radio frequency within the 2.4 GHz ISM frequency band may originate from a WLAN access point. Under such circumstance, step 280 is then executed for waking up the Wi-Fi module 110, thereby entering the normal mode for establishing wireless connection.

Figure 4:
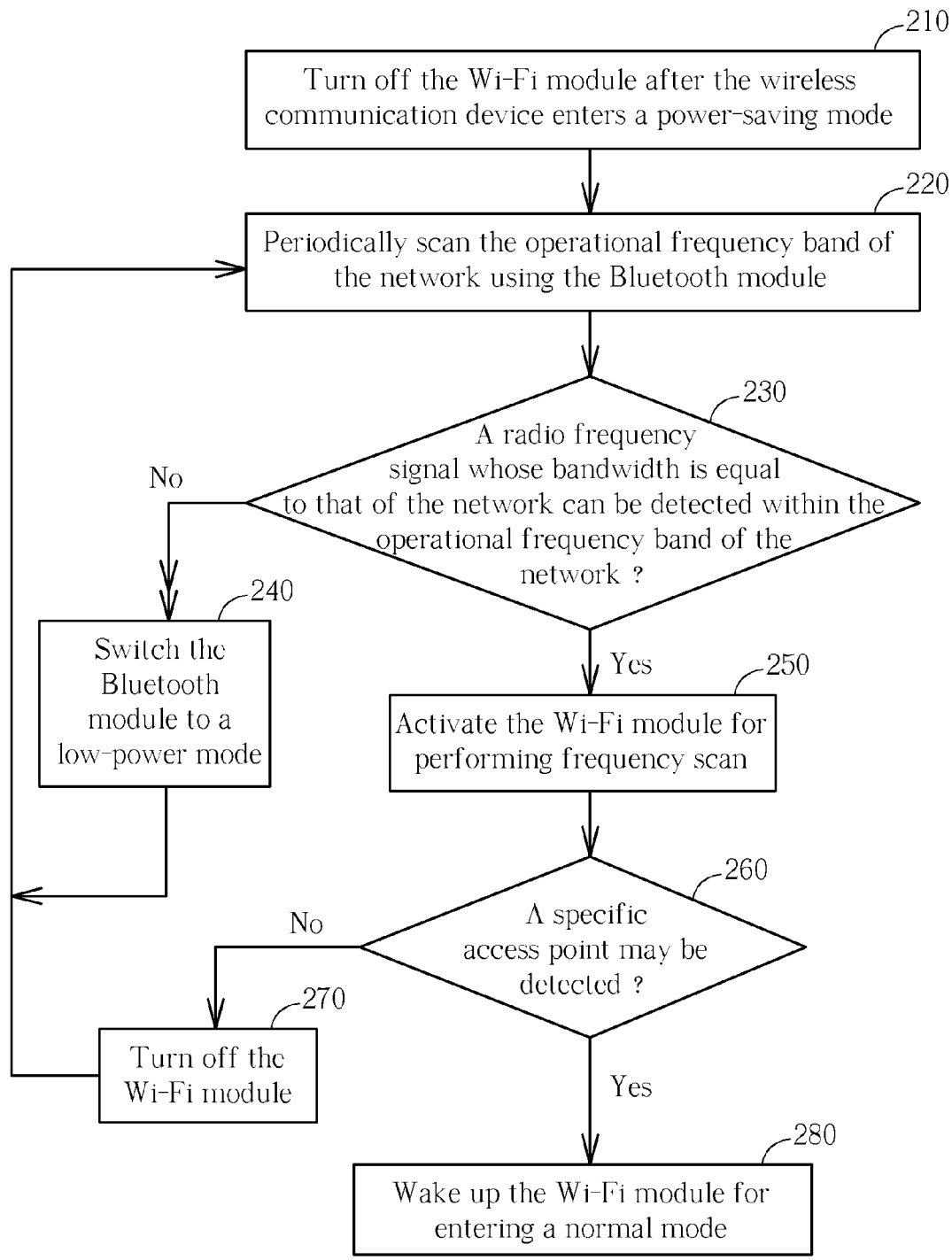
FIG. 4 is a flowchart illustrating the operation of a wireless network system according to a second embodiment of the present invention.

FIG. 4 is a flowchart illustrating the operation of the wireless network system 100 according to a second embodiment of the present invention. The flowchart in FIG. 4 includes the following steps:

Step 210: turn off the Wi-Fi module 110 after the wireless communication device UE enters a power-saving mode.

Step 220: periodically scan the operational frequency band of the network BS using the Bluetooth module 120.

Step 230: determine whether a radio frequency signal whose bandwidth is equal to that of the network BS can be detected within the operational frequency band of the network BS: if yes, execute step 250; if no execute step 240.

Step 240: switch the Bluetooth module 120 to a low-power mode; execute step 220.

Step 250: activate the Wi-Fi module 110 for performing frequency scan.

Step 260: determine whether a specific access point may be detected: if yes, execute step 280; if no, execute step 270.

Step 270: turn off the Wi-Fi module 110; execute step 220.

Step 280: wake up the wireless communication device UE for entering a normal mode.

Steps 210~240 and 280 in the second embodiment of the present invention may be executed in the same manner as those in the first embodiment of the present invention. However, the second embodiment of the present invention further includes steps 250~270.

In step 230 according to the embodiments illustrated in FIGS. 3C and 3D, the control circuit 140 may determine that the detected radio frequency signal within the 2.4 GHz ISM frequency band may originate from a WLAN access point. Under such circumstance, step 250 is then executed for performing frequency scan using the Wi-Fi module 110. If there is an access point present within the communication range of the wireless communication device UE, the Wi-Fi module 110 can acquire a corresponding service set identifier (SSID).

According to the scan result of the Wi-Fi module 110, it can be determined in step 260 whether a specific access point may be detected. According to different operational environments or settings of the wireless communication device UE, a user may create a candidate list including the SSIDs of one or more access points and store the candidate list in the storage unit 130. If the SSID of the specific access point detected by the Wi-Fi module 110 in step 250 is included in the candidate list, step 280 may then be executed for waking up the wireless communication device UE and entering the normal mode. If the Wi-Fi module 110 is unable to detect any SSID or all of the detected SSIDs are not included in the candidate list, step 270 may then be executed for turning off the Wi-Fi module 110.

In the present invention, the wireless communication device is configured to turn off the Wi-Fi module and periodically scan an operational frequency band of a network using the Bluetooth module after entering the power-saving mode. When detecting a radio frequency signal having the same bandwidth as the network in the operational frequency band, the wireless communication device may be wake up for entering the normal mode. Therefore, the present invention can provide an AOAC wireless communication method with low power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method with low power consumption, comprising:

turning off a wireless fidelity (Wi-Fi) module of a wireless communication device after the wireless communication device switches from a normal mode to a power-saving mode;

periodically scanning an operational frequency band of a network during a predetermined period using a Bluetooth module of the wireless communication device when the Bluetooth module is in an active mode and the wireless communication device is in the power-saving mode;

switching the Bluetooth module to a low-power mode from the active mode for periodically scanning the operational frequency band of the network at a predetermined interval when no radio frequency signal is detected within the operational frequency band during the predetermined period, wherein:

a scan frequency of the Bluetooth module in the active mode is the same as a scan frequency of the Bluetooth module in the low-power mode; and an interval at which the Bluetooth module scans the operational frequency band of the network in the low-power mode is kept unchanged; and activating the Wi-Fi module when the Bluetooth module detects a first radio frequency signal within the operational frequency band and the wireless communication device is in the power-saving mode, wherein a bandwidth of the first radio frequency signal is equal to a bandwidth of the network.

2. The method of claim 1, further comprising:
switching the wireless communication device from the power-saving mode to the normal mode when the Wi-Fi module detects an access point.

3. The method of claim 2, further comprising:
detecting a service set identifier (SSID) of the access point and determining whether the SSID is included in a candidate list; and switching the wireless communication device from the power-saving mode to the normal mode when the SSID is included in the candidate list.

4. The method of claim 1, wherein the low-power mode includes a sniff mode, a hold more or a park mode.

5. The method of claim 1, further comprising:
switching the Bluetooth module to the low-power mode from the active mode when detecting a second radio frequency signal within the operational frequency band, wherein a bandwidth of the second radio frequency signal is different from the bandwidth of the network.

* * * * *